(12) United States Patent
Claussen (10) Patent No.: US 10,057,778 B2
(45) Date of Patent: Aug. 21, 2018

(54) RADIO CELLS (71) Applicant: ALCATEL LUCENT, Paris (FR)

(72) Inventor: Holger Claussen, Blanchardstown (IE)

(73) Assignee: WSOU Investments, LLC, Los Angeles, CA (US)

(*) Notice: Subject to any disclaimer, the term of this patent is extended or adjusted under 35 U.S.C. 154(b) by 89 days.

(21) Appl. No.: 14/428,096

(22) PCT Filed: Sep. 6, 2013

(86) PCT No.: PCT/EP2013/002684
§ 371 (c)(1),
(2) Date: Mar. 13, 2015

(87) PCT Pub. No.: WO2014/040712
PCT Pub. Date: Mar. 20, 2014

(65) Prior Publication Data
US 2015/0264579 A1 Sep. 17, 2015

(30) Foreign Application Priority Data
Sep. 13, 2012 (EP) .................. 12360067

(51) Int. Cl.
H04W 72/00 (2009.01)
H04W 16/14 (2009.01)
(Continued)

(52) U.S. Cl.
CPC ........... *H04W 16/14* (2013.01); *H04W 16/28* (2013.01); *H04W 48/20* (2013.01); *H04W 72/00* (2013.01); *H04W 88/08* (2013.01)

(58) Field of Classification Search
CPC ..... H04W 16/14; H04W 16/28; H04W 48/20; H04W 88/08; H04W 72/00
(Continued)

(56) References Cited

U.S. PATENT DOCUMENTS 4,730,310 A 3/1988 Acampora et al.
5,686,926 A * 11/1997 Kijima .................. H01Q 25/00
342/371
(Continued)

FOREIGN PATENT DOCUMENTS

EP 1 184 938 A1 3/2002
WO WO 2012/020851 A1 2/2012

OTHER PUBLICATIONS

International Search Report for PCT/EP2013/002684 dated Jan. 16, 2014.
(Continued)

Primary Examiner — Mong-Thuy Tran
(74) Attorney, Agent, or Firm — Sean D. Burdick (57) ABSTRACT A method of providing a region of radio coverage within a wireless telecommunication network and a wireless telecommunication base station operable to provide that region of radio coverage. The base station comprises: transmission apparatus operable to provide a first region of radio coverage on a first radio frequency and a second region of radio coverage on a second radio frequency. The first region of radio coverage comprises a plurality of angularly spaced primary first radio beams and at least one secondary first radio beam. The base station is arranged to transmit the secondary first radio beam at a vertical tilt angle which differs from a tilt angle associated with the plurality of primary first radio beams. The second region of radio coverage comprises at least a primary second radio beam; that primary second radio beam is arranged to radiate from the base station between adjacent angularly spaced primary first radio beams. Aspects recognize that by providing two cells on a carrier, one vertically offset with respect to another, and horizontally offsetting a cell on a second carrier it may be possible to improve overall network performance.

14 Claims, 6 Drawing Sheets (51) Int. Cl.
*H04W 16/28* (2009.01)
*H04W 48/20* (2009.01)
*H04W 88/08* (2009.01)

(58) Field of Classification Search
USPC ..... 455/452.1, 447, 446, 450, 451; 370/320, 370/328, 329
See application file for complete search history.

(56) References Cited

U.S. PATENT DOCUMENTS

| | | | |
|---|---|---|---|
| 2003/0003959 A1 | 1/2003 | Tsui et al. | |
| 2003/0083069 A1 | 5/2003 | Vadgama | |
| 2006/0183503 A1 | 8/2006 | Jeffrey Goldberg | |
| 2007/0021151 A1* | 1/2007 | Mori | H04W 16/28 455/562.1 |
| 2008/0013599 A1 | 1/2008 | Malladi | |
| 2009/0066595 A1* | 3/2009 | Barker | H01Q 1/246 343/757 |
| 2010/0008311 A1* | 1/2010 | Oh | H04W 16/02 370/329 |
| 2010/0159930 A1* | 6/2010 | Hagerman | H01Q 3/04 455/436 |
| 2011/0199992 A1* | 8/2011 | Barker | H01Q 1/246 370/329 |

OTHER PUBLICATIONS

D. C. Kilper, et al., "Power Trends in Communication Networks," IEEE Journal of Selected Topics in Quantum Electronics, vol. 17, No. 2, Mar./Apr. 2011, pp. 275-284.

* cited by examiner

FIG. 4 Example SINR distributions and carrier coverage of: (a) traditional 3 sectors, (b) horizontal sector offset with 3 sectors [2], and (c) proposed extension to the vertical dimension by introducing additional cells using beams with higher downtilt

RADIO CELLS

FIELD OF THE INVENTION

The invention relates to a wireless telecommunication base station operable to provide a region of radio coverage within a wireless telecommunication network, and a method of providing a region of radio coverage in a wireless telecommunication network.

BACKGROUND

Wireless telecommunication systems are known. In such systems, mobile communication devices (for example, mobile telephones) are operable to communicate with base stations provided by network providers.

In known wireless telecommunication systems, radio coverage is provided to network connectable devices according to areas known as cells. A base station is located in each cell to provide radio coverage. Typically, user devices in each cell are operable to receive information and data from a base station and to transmit information and data to a base station.

User equipment roam through a wireless communications system. Base stations are typically provided which support areas of radio coverage. A number of such base stations are provided and are distributed geographically in order to provide a wide area of coverage to user equipment.

When user equipment is within an area served by a base station, communications may be established between the user equipment and the base station over associated radio links. Each base station typically supports a number of sectors within the geographical area of service. Typically, a different antenna within a base station supports each associated sector. Each base station has multiple antennas.

One problem in cellular networks is uneven distribution of signal to interference and noise ratio within a cell. Such an uneven distribution of signal to interference and noise ratio can lead to very high data rates in the centre of a cell, but very poor data rates at the cell edge and between sectors supported by a base station. LTE (also known as 4G) network architecture can address uneven distribution of signal to interference and noise ratio to some extent by employing interference coordination techniques. According to such techniques, parts of available sub-carriers are reserved for edge users and thus those edge users have increased signal to interference and noise ratios. A drawback of such an arrangement is that the frequency re-use is reduced and overall capacity within the network is therefore sacrificed.

It is desired to improve the configuration of cells within a wireless communication network.

SUMMARY

A first aspect provides a wireless telecommunication base station operable to provide a region of radio coverage within a wireless telecommunication network, the base station comprising: transmission apparatus operable to provide a first region of radio coverage on a first radio frequency and a second region of radio coverage on a second radio frequency, the first region of radio coverage comprising a plurality of angularly spaced primary first radio beams and at least one secondary first radio beam; the base station being arranged to transmit the secondary first radio beam at a vertical tilt angle which differs from a tilt angle associated with the plurality of primary first radio beams; the second region of radio coverage comprising at least a primary second radio beam; the primary second radio beam being arranged to radiate from the base station between adjacent angularly spaced primary first radio beams.

The first aspect recognises that one issue in cellular networks is an uneven distribution of signal to interference and noise ratio across a cell. Cells are supported by base stations in a manner which leads to very high data rates being achievable in a cell centre, but very poor data rates at a cell edge and between sectors of a cell.

Aspects described herein recognise that if multiple carriers, or non-overlapping portions of radio frequency band, are available at a base station, which is often the case in most areas and for most operators, an alternative cell configuration may be implemented which may significantly improve cell edge data rates and overall data rates.

For a multi-sector macro cell, aspects provide a second carrier, the sectors of which are shifted such that they point towards an area of poor performance in a first carrier, for example, those sectors are radially shifted so that they radiate "between" sectors of the first carrier. In the case of a three sector macro cell, it may be, for example, that main beams, or beam patterns, supporting the sectors of radio coverage on the second carrier are shifted by 60° with respect to the beam patterns supporting the sectors of coverage on the first carrier. Such a shift in sectors may require modified antennas, but the cost increase is small compared to resulting benefits. As a result of shifting the beam pattern of a second carrier in relation to a first carrier, regions of poor signal to interference and noise ratio, both between the sectors and at cell edges of a particular base station, are arranged such that they are no longer co-located in comparison to a typical co-located carrier deployment. In other words, the regions of poor coverage in each carrier no longer overlap.

It will be appreciated that "sectors" of coverage are supported by a radio beam pattern. That beam pattern will typically comprise a main directional beam which radiates from a base station in a "main" direction, indicated by the beam pattern axis. The number of sectors supported by a base station may vary, according to implementation chosen by a network provider. It will typically be desirable for a base station to provide 360 degree radio coverage extending fully around the base station. It will be appreciated that radio beams supported by a base station will typically be arranged to radiate from that base station in a generally horizontal manner. That beam may be directed towards users in a geographical region and, as a result, the "generally horizontal" beam may be tilted towards the ground, rather than towards the sky.

Furthermore, the first aspect recognises that by offering a primary and a secondary beam on a carrier, one of which is subject to a greater downtilt than the other, improved radio coverage may be offered to user equipment operating within a geographical region served by a base station. The angular transmission location of a more downtilted beam may be optimised as described in more detail below to provide overall improvements in coverage provided by a base station such that interference effects are minimised across the geographical region served by one or more base stations.

Although aspects have been described in relation to macro base stations, it will be appreciated that a small cell base station, such as a femto, pico, or home cell base station, may also be operable to support radio coverage regions in such a manner.

The regions of coverage provided by the first and second primary and secondary beams generally coincide across a geographical region, and typically overlap. The first aspect may be particularly useful when implemented by a number of base stations operating to provide a large region of radio coverage within a wireless communications network. In particular, aspects and embodiments described herein may provide a means to reduce interference effects by using only two radio carriers, or two subsets of radio carriers.

In one embodiment, the first and second regions of radio coverage are arranged such that sub-sections of radio coverage on the first radio frequency are adjacent sub-sections of radio coverage on the second radio frequency. By arranging neighbouring sub-sections of radio coverage within an overall region of radio coverage supported by a base station such that adjacent sub-sections are supported by different radio frequencies, it is possible to provide a region of coverage supported by a base station using only two frequencies in which there is less interference and less stringent handover timing requirements. Furthermore, the approach may be extended such that neighbouring base stations supporting neighbouring cells are orientated such that the complementary frequency arrangement is preserved, and adjacent sectors of neighbour cells use a complementary frequency, thus allowing for effective overall network operation using only two radio frequencies.

In one embodiment, the second region of radio coverage comprises a secondary second radio beam, the base station being arranged to transmit the secondary second radio beam at a vertical tilt angle which differs from a tilt angle associated with the primary second radio beam. Accordingly, by providing a second carrier on which beams having a different downtilt are provided, coverage provided to user equipment within a cell associated with a given radio carrier may be improved.

In one embodiment, the vertical tilt angle associated with at least one of the secondary first radio beam or the secondary second radio beam is static. Accordingly, a fixed small cell may be provided within a larger cell by the beam having a greater vertical downtilt. By providing a smaller cell within the larger cell, an improvement to overall data throughput and service experienced by user equipment within a network may be achieved.

In one embodiment, the vertical tilt angle associated with at least one of the secondary first radio beam or the secondary second radio beam may be configurable. According to some embodiments, the vertical tilt angle associated with at least one of the secondary first radio beam or the secondary second radio beam may be dynamically variable based upon feedback signalling received from user equipment operating within the region of radio coverage provided by the base station. Accordingly, the downtilt may be adjusted, in some embodiments, based upon environmental factors, for example, likely or dynamic distribution of user equipment within a region of radio coverage supported by a base station.

In one embodiment, the base station is arranged to transmit said secondary first radio beam such that it radiates from the base station between adjacent angularly spaced primary first radio beams. Accordingly, a small cell is provided between large cells, thereby providing a region of improved radio coverage in a region where adjacent primary first beams may interfere. By appropriately setting criteria for cell selection by user equipment, user equipment may be encouraged to select the small cell supported by the secondary first radio beam. That beam can be located in a region typically subject to a low signal to noise and interference ratio.

In one embodiment, the second region of radio coverage comprises a plurality of angularly spaced primary second radio beams. Accordingly, the second region of coverage may also extend around a portion of the 360 degrees around a base station. The second region may, for example, extend fully around the base station. The second region may offer an alternative frequency across the same region as the first frequency. That is to say, the geographical regions covered by first and second frequencies may be congruent.

In one embodiment, the base station is arranged to transmit the secondary second radio beam such that it radiates from the base station between adjacent angularly spaced primary second radio beams. Accordingly, a small cell is provided between large cells, thereby providing a region of improved radio coverage in a region where adjacent primary second beams may interfere. By appropriately setting criteria for cell selection by user equipment, user equipment may be encouraged to select the small cell supported by the secondary second radio beam. That beam can be located in a region typically subject to a low signal to noise and interference ratio.

In one embodiment, each of the angularly spaced primary second radio beams is arranged to radiate from the base station between adjacent angularly spaced primary first radio beams. Accordingly, between each pair of primary first radio beams, there may be arranged at least one primary second radio beam.

In one embodiment, the secondary first and second radio beams are arranged to radiate from the base station to bisect an angle between adjacent angularly spaced primary second and first radio beams respectively. Accordingly, the primary second beam may be provided mid-way between two primary first beams, thereby ensuring that a region of poor signal to interference ratio experienced on the first frequency is likely to experience high signal to interference ratio on the second frequency.

In one embodiment, the base station supports an identical number of primary and secondary first and second radio beams. Accordingly, a multi-sector base station may provide the same number of sectors on both the first and second frequency.

According to one embodiment, the transmission apparatus is operable to provide a third region of radio coverage on a third radio frequency, the third radio beam being arranged to radiate from the base station between adjacent angularly spaced primary first radio beams. It will be appreciated that although aspects are described in relation to a two frequency implementation, it is possible to extend the technique to three or more frequencies radiating from a single base station. In each case, each additional region of radio coverage is off-set in relation to the other regions of radio coverage provided on other frequencies. Embodiments and aspects described in relation to a second region and second frequency may also be implemented in respect of a third (or further) region and frequency, if available. It will, however, be appreciated that the aspects and embodiments described herein provide for reuse of just two different frequency bands, sub-bands or frequency ranges to provide an improved overall network performance.

In one embodiment, the transmission apparatus comprises: first antenna apparatus operable to transmit at least one of the angularly spaced primary first radio beams and at least one secondary first radio beam, and second antenna apparatus operable to transmit the primary second radio beam. Accordingly, each of the primary and/or secondary first and second beams may be supported by its own antenna.

According to one embodiment, least one of the first and second antenna apparatus comprises an antenna column. In one embodiment, at least one of the first and second antenna apparatus comprises an antenna array.

According to one embodiment, the first and second antenna apparatus are physically angled with respect to one another. Accordingly, the angular offset of beams radiating from a base station may be achieved via physical alignment or positioning of one or more antennas on a base station.

In one embodiment, at least one of the first and second antenna apparatus comprises an antenna array operable to form at least one of the primary or secondary first and second beams by beam forming techniques. Accordingly, rather than radially and/or vertically offsetting one beam with respect to another by physically tilting or arranging an antenna, it may be possible for one or both of the first and second primary and/or secondary beams to be radially and/or vertically offset by appropriate implementation of beam forming techniques.

In one embodiment, the first and second antenna apparatus comprise a single antenna array operable to form at least one of the first and at least one of the second primary or secondary radio beams. Accordingly, a single antenna array may support both a first and second primary and secondary beam by employing appropriate beam forming techniques.

In one embodiment, the first and second radio frequencies comprise different radio carriers. Accordingly, the technique may be used in, for example, GSM, WCDMA or LTE networks. A carrier will typically comprise a band of radio frequency.

According to one embodiment, the first and second radio frequencies lie within a single radio carrier. Accordingly, it will be appreciated that sub-bands of radio frequency may be used to support first and second radio regions. According to one embodiment, the first and second radio frequencies comprise at least one sub-carrier within a single radio carrier. According to some embodiments, the radio frequencies may comprise groups of sub-carriers. Those groups of sub-carriers may be continuous, or non-continuous.

A second aspect provides a method of providing a region of radio coverage within a wireless telecommunication network, the method comprising: providing a first region of radio coverage on a first radio frequency and a second region of radio coverage on a second radio frequency, the first region of radio coverage comprising a plurality of angularly spaced primary first radio beams and at least one secondary first radio beam; arranging transmission of the secondary first radio beam at a vertical tilt angle which differs from a tilt angle associated with the plurality of primary first radio beams; the second region of radio coverage comprising at least a primary second radio beam; arranging the primary second radio beam to radiate between adjacent angularly spaced primary first radio beams.

In one embodiment, the second region of radio coverage comprises a secondary second radio beam, and the method comprises arranging transmission of the secondary second radio beam at a vertical tilt angle which differs from a tilt angle associated with the primary second radio beam.

In one embodiment, the first and second regions of radio coverage are arranged such that sub-sections of radio coverage on the first radio frequency are adjacent sub-sections of radio coverage on the second radio frequency.

In one embodiment, the vertical tilt angle associated with at least one of the secondary first radio beam or the secondary second radio beam is static.

In one embodiment, the vertical tilt angle associated with at least one of the secondary first radio beam or the secondary second radio beam may be configurable. According to some embodiments, the vertical tilt angle associated with at least one of the secondary first radio beam or the secondary second radio beam may be dynamically variable based upon feedback signalling received from user equipment operating within the region of radio coverage provided by the base station.

In one embodiment, the method comprises arranging to transmission of the secondary first radio beam such that it radiates from the base station between adjacent angularly spaced primary first radio beams.

In one embodiment, the second region of radio coverage comprises a plurality of angularly spaced primary second radio beams.

In one embodiment, the method comprises arranging transmission of the secondary second radio beam such that it radiates between adjacent angularly spaced primary second radio beams.

In one embodiment, the method comprises arranging each of the angularly spaced primary second radio beams to radiate between adjacent angularly spaced primary first radio beams.

In one embodiment, the method comprises arranging the secondary first and second radio beams to radiate from the base station to bisect an angle between adjacent angularly spaced primary second and first radio beams respectively.

In one embodiment, there are an identical number of primary and secondary first and second radio beams.

According to one embodiment, the method comprises providing a third region of radio coverage on a third radio frequency, and arranging the third radio beam to radiate between adjacent angularly spaced primary first radio beams.

In one embodiment, the method comprises providing transmission apparatus which comprises: first antenna apparatus operable to transmit at least one of the angularly spaced primary first radio beams and at least one secondary first radio beam, and second antenna apparatus operable to transmit the primary second radio beam.

According to one embodiment, least one of the first and second antenna apparatus comprises an antenna column.

In one embodiment, at least one of the first and second antenna apparatus comprises an antenna array.

According to one embodiment, the method comprises physically angling the first and second antenna apparatus with respect to one another.

In one embodiment, at least one of the first and second antenna apparatus comprises an antenna array operable to form at least one of the primary or secondary first and second beams by beam forming techniques.

In one embodiment, the first and second antenna apparatus comprise a single antenna array operable to form at least one of the first and at least one of the second primary or secondary radio beams.

In one embodiment, the first and second radio frequencies comprise different radio carriers.

According to one embodiment, the first and second radio frequencies lie within a single radio carrier.

A further aspect provides a plurality of coordinated base stations according to the first aspect arranged to provide a region of radio coverage within a wireless communications network using only said first and second radio frequencies.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

BRIEF DESCRIPTION OF THE DRAWINGS

Embodiments of the present invention will now be described further, with reference to the accompanying drawings, in which.

DESCRIPTION OF THE EMBODIMENTS

Figure 1:
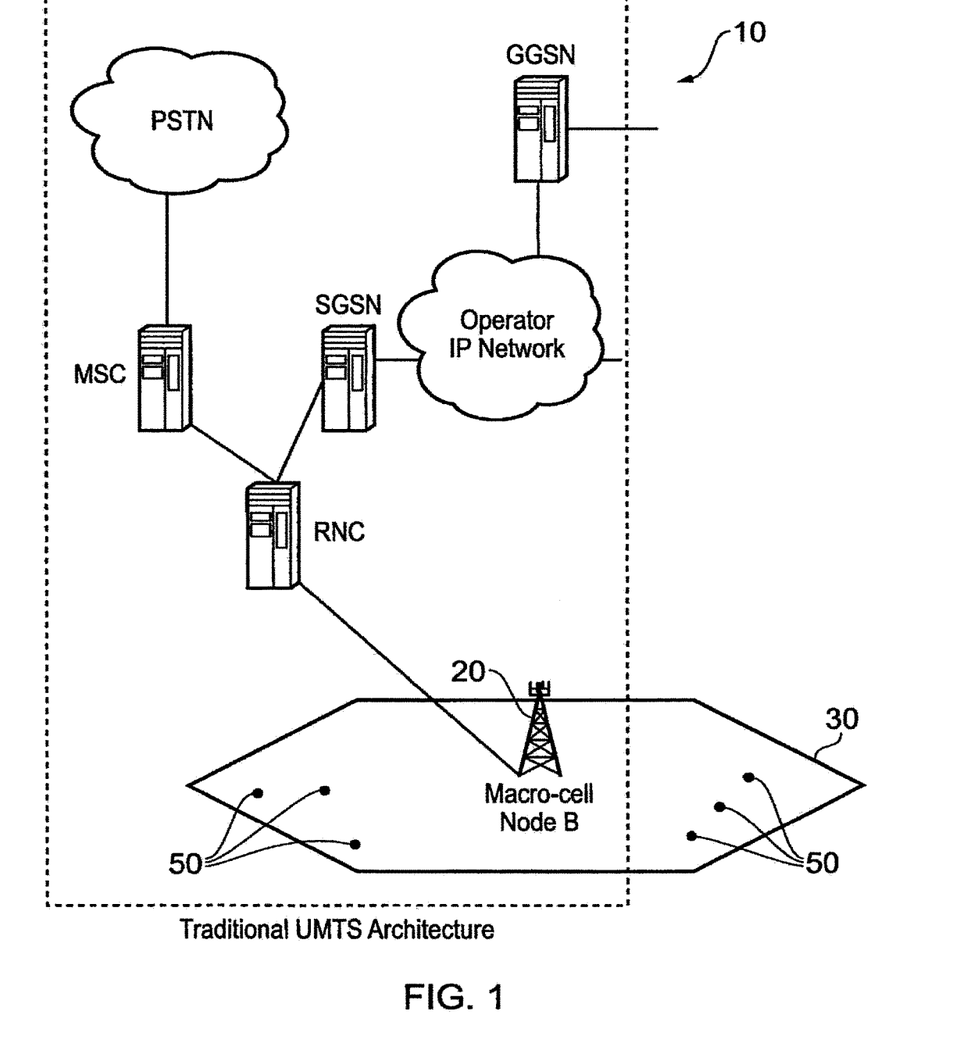
FIG. 1 illustrates the main components of a telecommunications network according to one embodiment.

FIG. 1 illustrates schematically the main components of a wireless telecommunications system 10 according to one embodiment. User equipment 50 roam through the wireless telecommunications system. Base stations 20 are provided which support areas of radio coverage 30. A number of such base stations 20 are provided and are distributed geographically in order to provide a wide area of coverage to user equipment 50.

When user equipment is within an area served by a base station 30, communications may be established between the user equipment and the base station over associated radio links. Each base station typically supports a number of sectors within the geographical area of service 30.

Typically, a different antenna within a base station supports each associated sector. Each base station 20 has multiple antennas. It will be appreciated that FIG. 1 illustrates a small subset of a total number of user equipment and base stations that may be present in a typical communication system.

Figure 2:
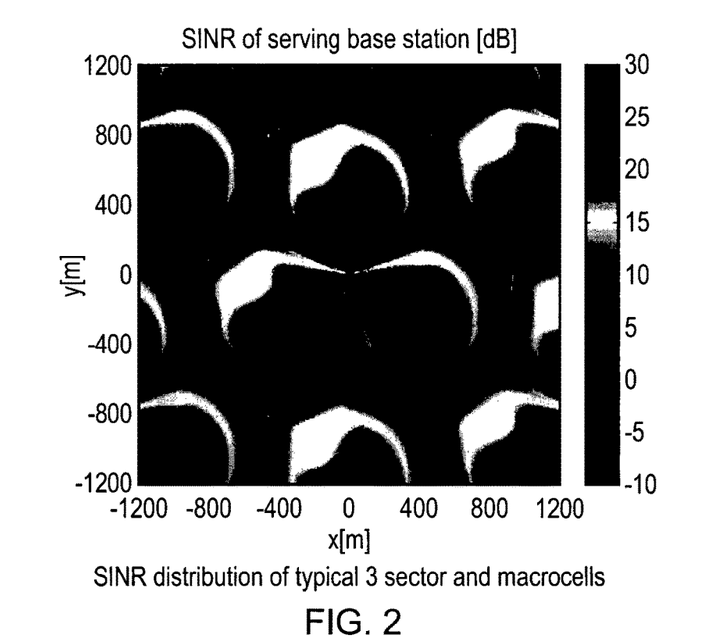
FIG. 2 illustrates a signal to interference and noise ratio distribution of a typical three sector macro cell network.

One issue in cellular networks is an uneven distribution of signal to interference and noise ratio across a cell. Cells are supported by base stations in a manner which leads to very high data rates being achievable in a cell centre, but very poor data rates at a cell edge and between sectors of a cell. FIG. 2 illustrates the signal to interference and noise distribution of a typical three sector cell being supported by a base station and a series of adjacent base stations being provided across a geographical area. Poor signal to noise and interference ratios resulting in poor data rates at the cell edge and between sectors are shown as blue-green areas, and form a generally hexagonal pattern.

The interference issue can be addressed in LTE by coordinating interference such that parts of available sub-carriers are reserved for edge users, thereby increasing the available signal to interference and noise ratio for those edge users. One drawback of such an arrangement is that it reduces frequency re-use within a wireless communication network and thus may act to sacrifice overall network capacity. Another way to increase cell edge rates would be to incorporate static frequency planning when configuring a network and arranging to use different carriers in neighbouring cells.

In this way, the cell edge signal to interference and noise ratios may be improved by planning frequencies in a way that neighbouring cells use different carriers. Such an approach may typically be used in GSM networks. Such an arrangement typically reduces frequency re-use factor and can lead to a low spectral efficiency across a given geographical area.

In flexible systems such as LTE interference may be coordinated. Such coordination typically offers a more dynamic interference mitigation approach compared to static frequency planning. By reserving part of the spectrum for cell edge users and by incorporating clever scheduling in network operation, the overall operation of a network may be enhanced by giving up some overall capacity. By reserving part of the spectrum it will be understood that a lower frequency re-use factor is employed and overall cell performance is sacrificed for the benefit of edge users. It will be appreciated however, that interference coordination methods may not be used in some network architectures such as UMTS and CDMA 2000.

Some networks are operable to perform in a multiple input multiple output (MIMO) manner and thus joint transmissions of multiple base stations add up at an end user in a constructive way such that signal to interference and noise ratio is maximised. According to such methods, transmissions on two bands of frequency may be employed, and typically two or more antennas may be required to support appropriate transmissions in each sector of a base station.

Before describing particular embodiments in detail, a general overview will be provided. Aspects described herein recognise that if multiple carriers are available at a base station, which is the case in most areas and for most operators, an alternative cell configuration may be implemented which may significantly improve cell edge data rates and overall data rates. For example, a horizontal and vertical sector offset configuration for multi-carrier macrocell networks can both increase the overall cell capacity and significantly increase the cell edge capacity without needing to reserve parts of the spectrum for cell edge users.

Aspects described herein recognise that if multiple carriers are available at a base station, which is the case in most areas and for most operators, an alternative cell configuration may be implemented which may significantly improve cell edge data rates and also overall data rates.

For a three sector macro cell, a horizontal offset configuration requires that for a second carrier the sectors of each carrier are shifted such that they point towards an area of poor performance in a first carrier or between sectors of the first carrier. In the case of a three sector macro cell, it may be that the sectors are shifted by 60°. Such a shift in sectors may require modified antennas, but the cost increase is small compared to resulting benefits. As a result of shifting the beam pattern of a second carrier in relation to a first carrier, regions of poor signal to interference and noise ratio both between the sectors and at cell edges of a particular base station are arranged such that they no longer overlap in comparison to a typical co-located carrier deployment.

It will be appreciated that user equipment, for example, mobile telephones, operate such that they "hand over" to the best available carrier; that is to say, the carrier which the user equipment sees as having the highest signal to interference and noise ratio or the highest received power at the user equipment. Providing carriers which can offer a higher signal to interference and noise ratio can lead to a significant increase in user data rates, particularly at cell edges, without reducing frequency re-use factor which remains at complete re-use.

The general principle may be extended to any number of sectors and any number of carriers or sub-carriers and may be generally applicable to different network provision protocols and air interfaces such as UMTS, CDMA and LTE.

In a horizontal offset arrangement two carriers may be provided by a base station. Coverage on each carrier is provided by a base station in three sectors. In a traditional implementation carriers 1 and 2 are provided such that their beams are strongest or directed in substantially identical directions leading to an overall multi carrier configuration in which areas of poor signal to noise and interference ratio are experienced on both carriers in the same locations.

A horizontal offset configuration of carriers may be implemented at a base station. In such a scenario, the main beam supporting each sector of carrier 1 is offset in relation to the main beam supporting each sector of the second carrier. That is to say, the beam pattern of carrier 2 is shifted by 60° in relation to the beam pattern supported on carrier 1. The sectors are therefore offset with respect to one another. It will, however, be appreciated that sectors are merely an academic construct and that each sector is supported by a beam radiating from a base station in the centre of the beam pattern.

Because of the relative horizontal sector offset described, areas with poor signal to interference and noise ratio experienced on a first carrier and a second carrier do not overlap. However, full frequency re-use is allowed.

Base stations having horizontal offset capability support multiple cells within a network. As a result of providing each base station operating in a region of a network with two carriers and as a result of horizontally offsetting the beam pattern of the second carrier with respect to the first at each base station, a region of radio coverage may be provided within a network which provides a significant improvement of signal to interference and noise ratio for those users at the cell edge and provides an improved overall network capacity by avoiding poor signal to interference and noise ratio in relation to cell boundaries. However, such an arrangement may require more frequent handover intra-cell and inter-cell and requires a different antenna configuration in order to provide such a different multi carrier configuration having sector offsets.

Horizontal sector offset approaches can be extended to encompass a vertical dimension. Such approaches may significantly outperform standard antenna arrangements having an identical number of antennas and identical processing resources. Such approaches, incorporating a vertical offset may, according to some implementations, be easily executed and typically do not require additional channel feedback, as can be required, for example, in traditional beam-forming approaches.

Traditional beam-forming requires channel feedback for all paths between antennas which is associated with high measurement and reporting overheads, and typical user equipment does not support such reporting as standard. Furthermore, if beam-forming is applied in all sectors with frequency re-use between sectors, beam forming is likely to lead to increased interference between beams if it is not coordinated optimally across sectors and cells.

Aspects and embodiments described do not require additional channel feedback and can provide an implementation offering improved beam coordination between sectors and cells, leading to less interference and greater overall cell coverage.

According to aspects and embodiments a horizontal sector offset cell configuration can be extended into the vertical dimension by arranging antenna such that in each sector a first static beam is provided using a first carrier and an additional static beam with higher downtilt is provided on a complementary carrier.

Figure 3:
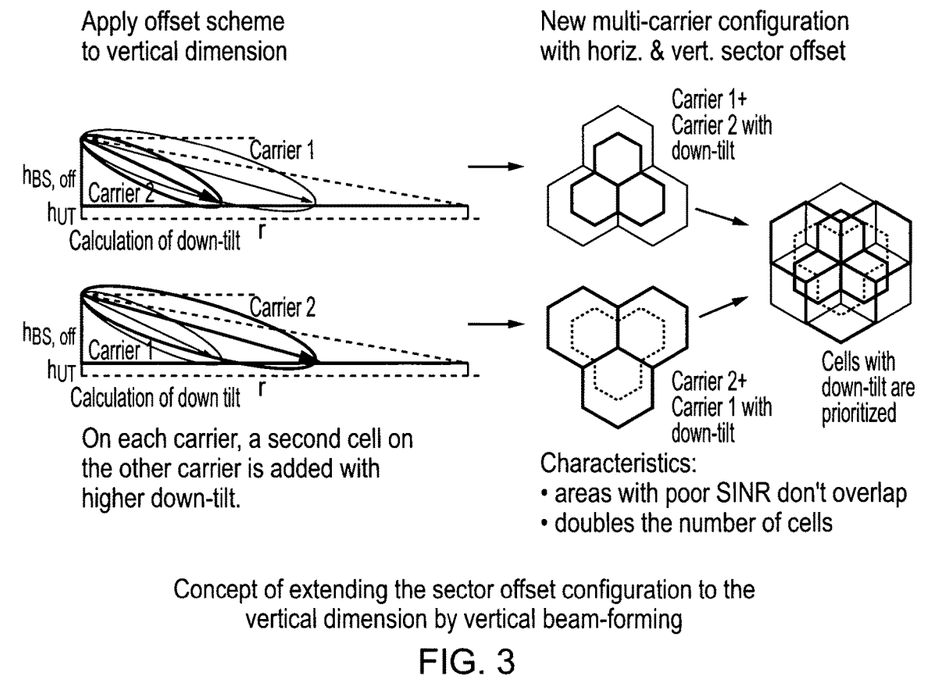
FIG. 3 illustrates schematically a configuration with horizontal and vertical cell offset.

FIG. 3 illustrates schematically a vertical cell offset configuration according to one embodiment. Arranging for a beam on each of two carriers to be provided in each sector results in creation of a "new" cell within each existing sector as described in more detail below.

According to some embodiments, antenna(s) provided on a base station or remote radio head are used to transmit sectors supported by the base station using a first carrier, and a second beam is transmitted using a second carrier by those same antenna(s), the second carrier beam being transmitted with higher downtilt, thus allowing local reuse of radio spectrum whilst avoiding causing high interference with any neighbouring cells or sectors.

According to some embodiments, the antennas that transmit primary sectors for a second carrier may be operable to also transmit a second beam on the first carrier, that second beam being transmitted with higher downtilt.

In order to achieve good load balancing between a "normal" or "primary" beam and the downtilted beam supported by each antenna, in some embodiments the downtilted beam is prioritized by users if the signal quality (determined from, for example, Ec/Io, SINR or similar) exceeds a predefined threshold, for example, 0 dB. The predefined threshold may be defined or selected such that the worst users of either beam within a sector achieve similar data rates. Such an approach may balance benefits of improved SINR and offloading.

Figures 4, 4A:
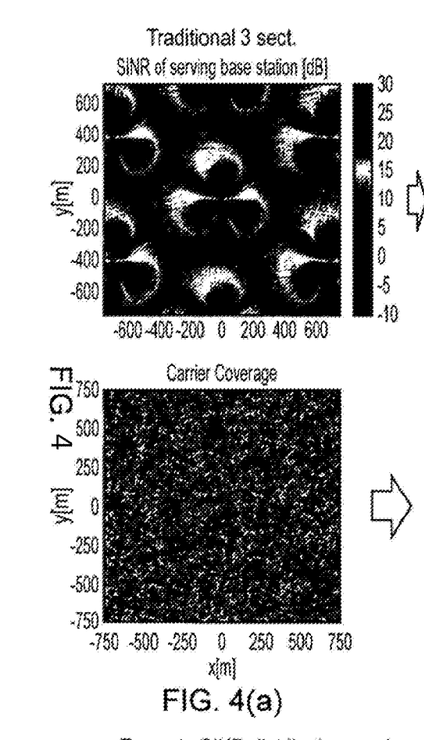
FIG. 4 illustrates schematically possible SINR distributions and carrier coverage in relation to various sector and carrier configurations implemented at base stations within a network.
Figure 4B:
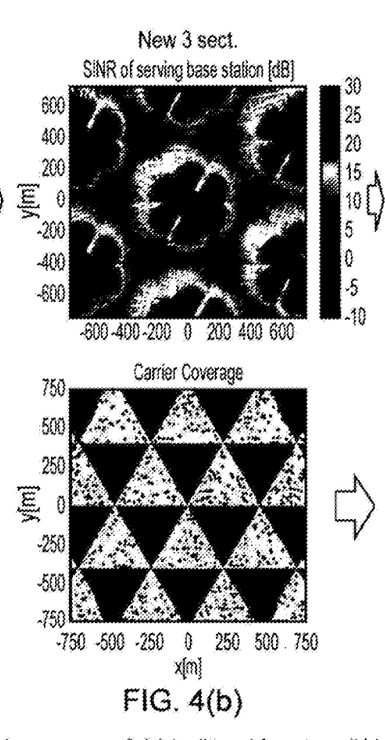
Figure 4C:
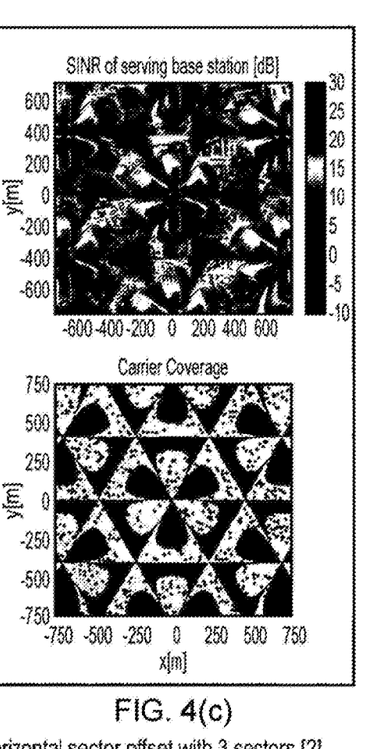

FIG. 4 illustrates schematically possible SINR distributions and carrier coverage in relation to various sector and carrier configurations implemented at base stations within a network. FIG. 4(a) illustrates a traditional 3 sector base station network; FIG. 4(b) illustrates an implementation of a network in which base stations capable of transmitting on two carriers are configured to transmit using a horizontal sector offset with 3 sectors; and FIG. 4(c) illustrates an implementation in which both horizontal and vertical dimension offsets are supported and "additional" cells are provided by providing a downtilted beam on a secondary carrier in each sector.

It will be appreciated that if overlaying a vertically offset sector configuration with a horizontally offset sector configuration, a modified cell structure in the form of a multi-carrier cell configuration results. That configuration may be implemented in some embodiments such that neighbouring sectors using a different carrier.

A horizontal offset sector configuration is illustrated in FIG. 4b in which it can be seen that by using two carriers an alternating "best carrier" pattern is seen by user equipment roaming through the network. In such a configuration all served users are always in the "high gain" areas of each antenna lobe. As a result of the SINRs both overall and at the cell edges is improved significantly compared to traditional cell configurations, resulting in higher throughput. The configuration shown does not result in an increased measurement and reporting overhead at user equipment since the beam-forming is static and users are connected to those static beams instead of beams being formed to follow user equipment. It will be appreciated that such an approach is compliant with current user equipment capabilities.

Example Configuration of Base Station Supporting 3 Sectors on Two Carriers

According to one embodiment, a base station may be operable to support a cell configuration comprising three sectors on two carriers as illustrated schematically by FIG. 4(c).

The top row of FIG. 4 illustrates, for various configurations, a resulting SINR distribution. FIG. 4a illustrates the distribution for a traditional 3 sector configuration, FIG. 4b illustrates the distribution for a horizontal offset configuration and FIG. 4c illustrates the distribution for a horizontal offset and vertical beam forming offset configuration. It can be seen that the offset configurations illustrated in FIG. 4(b) and FIG. 4(c) result in fewer areas of poor SINR.

The bottom row of FIG. 4 illustrates, for various base station configurations, a schematic of best carrier coverage across a geographical area served by a plurality of such base stations. The light regions indicate areas best served by a first carrier and the dark regions indicate areas best covered a second carrier.

It can be seen that the configuration illustrated in FIG. 4(c) results in additional "flower-shaped" cells, centered on each base station site. To achieve sufficient offload of user equipment, the down-tilted beams are prioritized by user equipment up to a pre-defined SINR. FIG. 4(c) illustrates an implementation in which the area is covered by the down-tilted beams until the SINR reaches 0 dB. From that point on, coverage is switched to the "primary" or normal beams supported by an antenna and the remaining area in a cell has radio coverage provided to user equipment by that primary beam.

FIG. 4(c) illustrates a configuration in which, for each cell, the neighbouring cells are served by a different carrier. Such a configuration can be seen to result in high SINRs experienced at the cell edges. That result is achieved without reducing frequency re-use factor across the network.

It will be understood that according to some embodiments, multiple cells are arranged, with horizontal and/or vertical offset with respect to each other, such that neighbouring areas of coverage are served by different frequencies. Such an arrangement can be achieved with only two different frequencies or frequency ranges or groups. Cell arrangements may thus be implemented such that the cell deployments cause less overall interference within a network. Furthermore, since many base stations and user equipment are operable to receive two different frequencies or frequency ranges or groups, using only two such frequencies may result in a need for less stringent handover timing requirements. Neighbouring cells are orientated such that adjacent sectors of neighbouring cells use the complementary frequency, where two frequencies are used.

Application to Higher Sectorization

It will be appreciated that the concept of combining horizontal and vertical offsets can be extended to apply to base stations supporting cells having a higher number of sectorizations, for example, a 6 sector offset configuration, supported by a circular antenna array.

Figure 5:
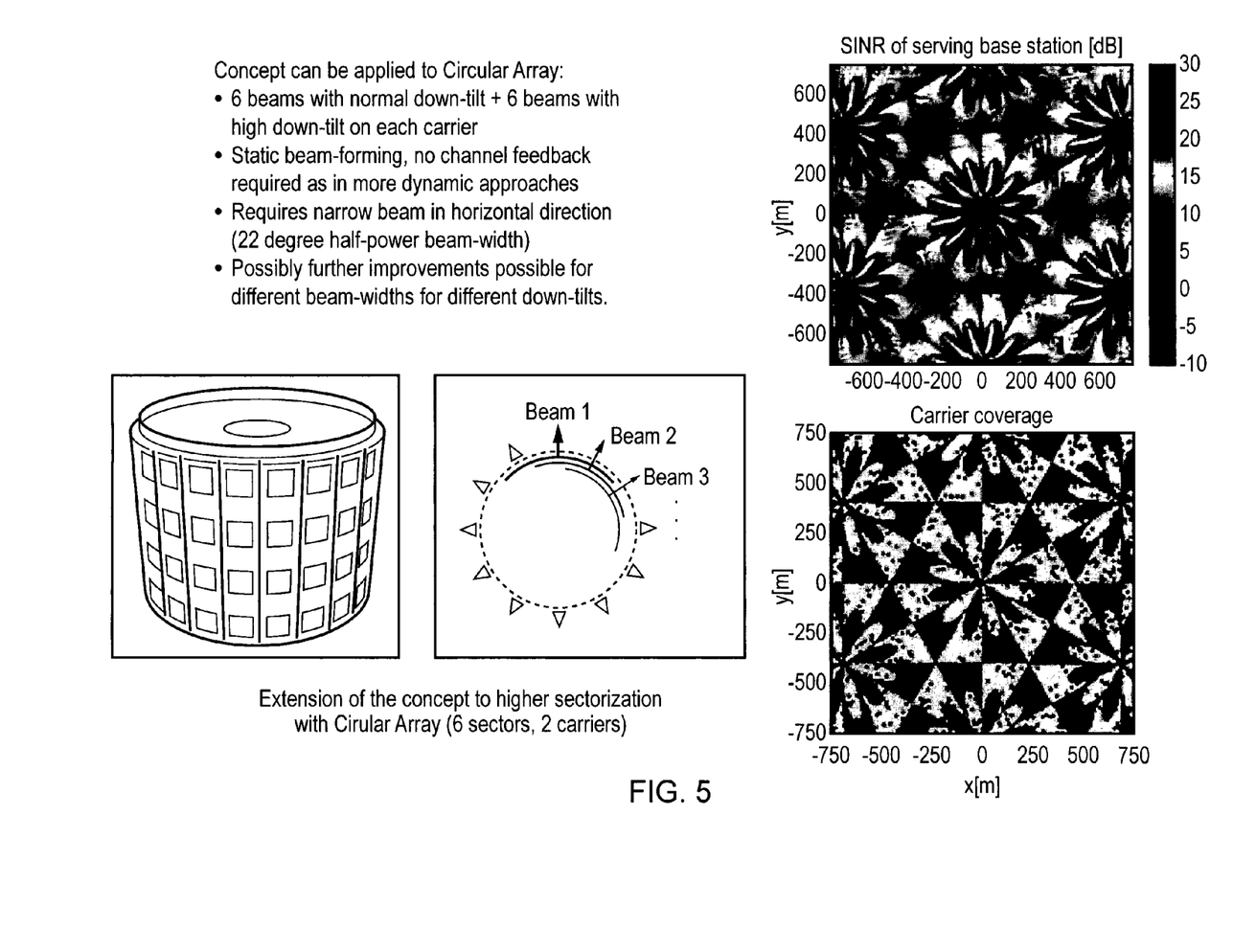
FIG. 5 illustrates a possible implementation of an embodiment using a circular antenna array.

FIG. 5 illustrates a possible implementation of an embodiment using a circular antenna array. Using an antenna array such as the circular array shown allows for operation using variable beam widths. Variable beam widths may be used to potentially further improve network performance by, for example, forming narrower beams in the horizontal dimension in the case of beams being transmitted with a higher downtilt.

Simulation Results

Simulations performed for a UMTS HSDPA network allowed evaluation of downlink performance for a combined horizontal and vertical offset transmission scheme utilising vertical beamforming (vBF) compared to other transmission configurations.

Figure 6:
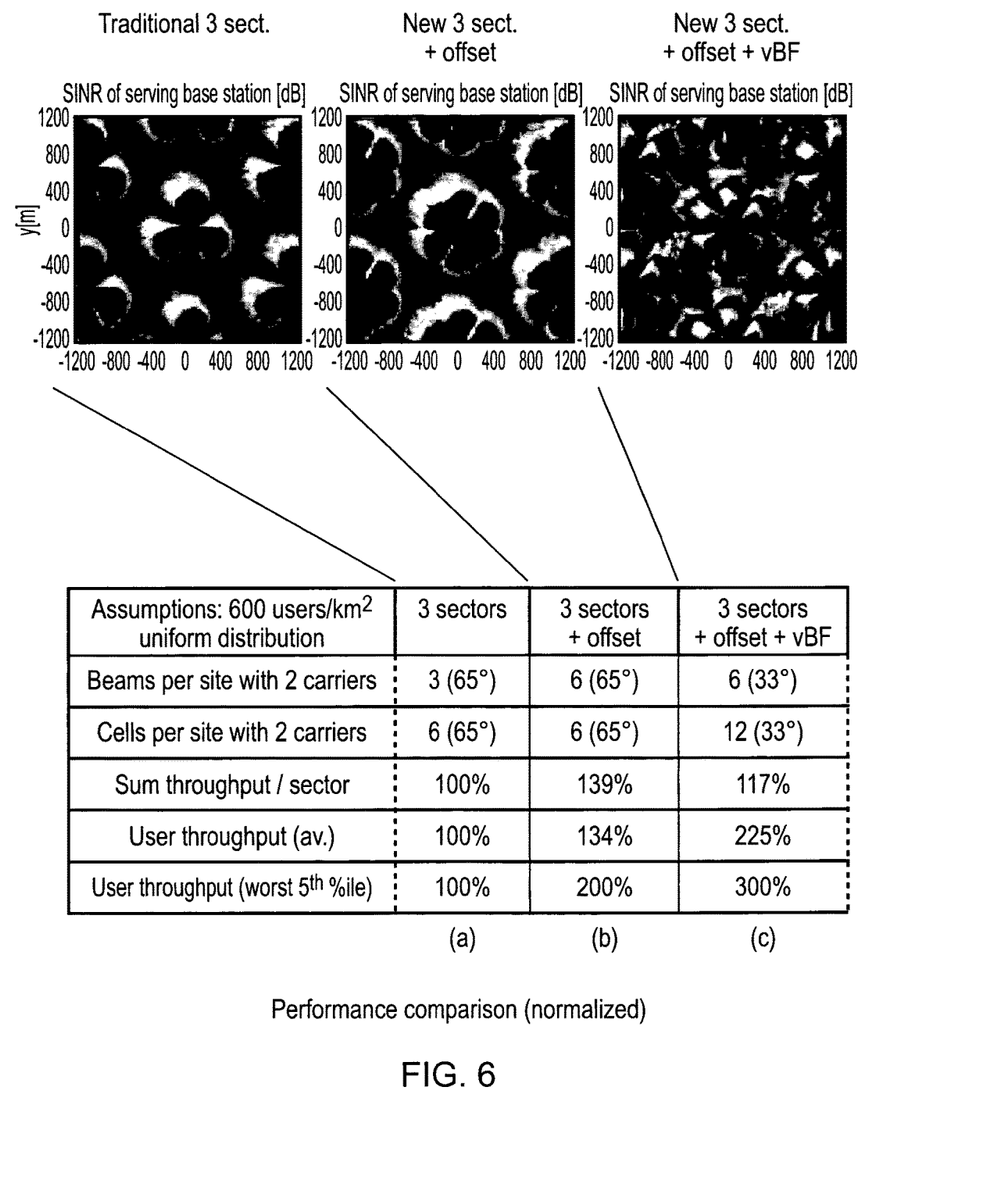
FIG. 6 illustrates schematically results of simulations of various transmission configurations implemented by base stations in a UMTS HSDPA capable network.

FIG. 6 illustrates schematically results of simulations of various transmission configurations implemented by base stations in a UMTS HSDPA capable network. The results are shown in FIG. 6 in relation to both 3 sector and 6 sector configurations. Performance results are normalized.

FIG. 6(a) illustrates a traditional 3 sector configuration using two carriers.

FIG. 6(b) illustrates a 3 sector transmission configuration employing a horizontal sector offset. It can be seen that both average user throughput and throughput of worst users within the network is improved significantly over the configuration shown in FIG. 6(a).

FIG. 6(c) illustrates a three sector approach in which a horizontal offset configuration is extended to use a vertical sector offset through use of vertical beamforming techniques. It can be seen that such a configuration allows both average user throughput and worst user throughput to experience significant further improvement to 225% and 300% compared to a traditional 3-sector approach as shown in FIG. 6(a).

FIG. 6(d) illustrates a traditional 6-sector configuration using two carriers. It will be appreciated that such a traditional configuration requires the same number of beams/antennas and cells (processing units) as the configuration scenario shown in FIG. 6(c), but that the traditional 6 sector configuration performs less well.

FIG. 6(e) illustrates a 6 sector transmission configuration utilising a horizontal sector offset between carriers. It can be seen that average user throughput and throughput experienced by worst users is improved in comparison to the configuration of FIG. 6(d).

FIG. 6(f) illustrates a 6 sector, 2 carrier offset transmission configuration using both horizontal and vertical sector offsets, the vertical offset being achieved by vertical beamforming techniques. It can be seen that both average user throughput and throughput experienced by worst users shows further improvements compared to the 3 sector configuration of FIG. 6(c).

In summary, the proposed cell configurations shown in FIG. 6(c) and FIG. 6(f) outperform traditional approaches shown in FIGS. 6(a) and 6(d) in terms of overall throughput achieved.

Extension and Application to LTE/Subcarriers

Aspects and embodiments described herein may be extended to any number of sectors and/or carriers (or sub-carriers) and are generally applicable to different air interfaces and Radio Access Technologies, for example, UMTS, LTE and similar.

It will be appreciated, for example that a base station may be operable, rather than using different carriers as described above in relation to horizontal and vertical sector offsets, the base station may be configured to implement offset techniques to subcarriers within one carrier. For example, in an LTE implementation, half of available sub-carriers may be transmitted normally, and the remaining half may be transmitted with an appropriate horizontal offset. The same principle may be applied to sub-carriers to achieve a vertical offset. In such a case, a scheduler at the base station would typically be operable to automatically assign users to the best sub-carriers based on channel feedback without need for handovers and measurements on other carriers.

Aspects and embodiments provide an extension of horizontal offset sector cell configurations into the vertical dimension via vertical beam forming techniques. Transmission configurations employed by base stations in accordance with aspects and embodiments may substantially remove a typical poor SINR region experienced by user equipment between sectors and may improve edge SINR.

In contrast to traditional beam-forming, techniques described do not require any additional channel feedback from user equipment and thus techniques may be used with existing mobile radio standards, for example, UMTS, CDMA200, or LTE compatible user equipment.

The concept described herein may also be applied to sub-carriers in OFDM systems, for example, LTE, in which instead of multiple carriers, groups of sub-carriers are used. According to such an implementation a base station scheduler may operate to implement an optimal frequency allocation (based on SINR maximization) and no inter-carrier handovers are required.

Improvements to average user data rates and data rates of cell edge users may be achieved by implementing aspects and embodiments described.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The functions of the various elements shown in the Figures, including any functional blocks labelled as "processors" or "logic", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" or "logic" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A wireless telecommunication base station operable to provide a region of radio coverage within a wireless telecommunication network, said base station comprising:
   a transmission apparatus including a transmitter and a number of antennas configured to create a first region of radio coverage on a first radio frequency and a second region of radio coverage on a second radio frequency, said first region of radio coverage comprising a plurality of angularly spaced primary first radio beams and at least one secondary first radio beam; said base station being arranged to transmit said secondary first radio beam at a vertical tilt angle which differs from a tilt angle associated with said plurality of primary first radio beams;
   said second region of radio coverage comprising at least a primary second radio beam and a secondary second radio beam; said primary second radio beam being arranged to radiate from said base station between adjacent angularly spaced primary first radio beams, and wherein said base station is operable to set criteria for cell selection by user equipment such that user equipment are encouraged to select a small cell supported by said secondary first radio beam;
   wherein said secondary first and second radio beams are arranged to radiate from said base station to bisect an angle between adjacent angularly spaced primary second and first radio beams respectively.

2. A wireless telecommunication base station according to claim 1, wherein said first and second regions of radio coverage are arranged such that sub-sections of radio coverage on said first radio frequency are adjacent sub-sections of radio coverage on said second radio frequency.

3. A wireless telecommunication base station according to claim 1, said base station being arranged to transmit said secondary second radio beam at a vertical tilt angle which differs from a tilt angle associated with said primary second radio beam.

4. A wireless telecommunication base station according to claim 1, wherein said base station is arranged to transmit said secondary first radio beam such that it radiates from said base station between adjacent angularly spaced primary first radio beams.

5. A wireless telecommunication base station according to claim 1, wherein said second region of radio coverage comprises a plurality of angularly spaced primary second radio beams.

6. A wireless telecommunication base station according to claim 5, wherein said base station is arranged to transmit said secondary second radio beam such that it radiates from said base station between adjacent angularly spaced primary second radio beams.

7. A wireless telecommunication base station according to claim 5, wherein each of said angularly spaced primary second radio beams is arranged to radiate from said base station between adjacent angularly spaced primary first radio beams.

8. A wireless telecommunication base station according to claim 1, wherein said number of an antennas comprises a first antenna apparatus operable to transmit at least one of said angularly spaced primary first radio beams and at least one secondary first radio beam, and a second antenna apparatus operable to transmit said primary second radio beam.

9. A wireless telecommunication base station according to claim 8, wherein at least one of said first and second antenna apparatus comprises an antenna array.

10. A wireless telecommunication base station according to claim 8, wherein at least one of said first and second antenna apparatus comprises an antenna array operable to form at least one of said primary or secondary first and second beams by beam forming techniques.

11. A wireless telecommunication base station according to claim 10, wherein said first and second antenna apparatus comprise a single antenna array operable to form at least one of said first and at least one of said second primary or secondary radio beams.

12. A wireless telecommunication base station according to claim 1, wherein said first and second radio frequencies comprise different radio carriers.

13. A wireless telecommunication base station operable to provide a region of radio coverage within a wireless telecommunication network, said base station comprising:
a transmission apparatus including a transmitter and a number of antennas configured to create a first region of radio coverage on a first radio frequency and a second region of radio coverage on a second radio frequency, said first region of radio coverage comprising a plurality of angularly spaced primary first radio beams and at least one secondary first radio beam; said base station being arranged to transmit said secondary first radio beam at a vertical tilt angle which differs from a tilt angle associated with said plurality of primary first radio beams;
said second region of radio coverage comprising at least a primary second radio beam and a secondary second radio beam; said primary second radio beam being arranged to radiate from said base station between adjacent angularly spaced primary first radio beams, and wherein said base station is operable to set criteria for cell selection by user equipment such that user equipment are encouraged to select a small cell supported by said secondary first radio beam;
wherein said first and second regions of radio coverage are arranged such that sub-sections of radio coverage on said first radio frequency are adjacent sub-sections of radio coverage on said second radio frequency; and
wherein said base station supports an identical number of primary and secondary first and second radio beams.

14. A method of providing a region of radio coverage within a wireless telecommunication network, said method comprising:
providing a transmission apparatus including a transmitter and a number of antennas; and
configuring said transmission apparatus to create a first region of radio coverage on a first radio frequency and a second region of radio coverage on a second radio frequency, said first region of radio coverage comprising a plurality of angularly spaced primary first radio beams and at least one secondary first radio beam and said second region of radio coverage comprising at least a primary second radio beam and a secondary second radio beam;
arranging transmission of said secondary first radio beam at a vertical tilt angle which differs from a tilt angle associated with said plurality of primary first radio beams;
arranging said primary second radio beam to radiate between adjacent angularly spaced primary first radio beams; and
setting criteria for cell selection by user equipment such that user equipment are encouraged to select a small cell supported by said secondary first radio beam;
wherein at least one of: (i) said secondary first and second radio beams are arranged to radiate from said base station to bisect an angle between adjacent angularly spaced primary second and first radio beams respectively; and (ii) said base station supports an identical number of primary and secondary first and second radio beams.

* * * * *